United States Patent
Momirov

(12) 
(10) Patent No.: US 6,484,209 B1
(45) Date of Patent: *Nov. 19, 2002

(54) EFFICIENT PATH BASED FORWARDING AND MULTICAST FORWARDING

(75) Inventor: Milan Momirov, San Francisco, CA (US)

(73) Assignee: Nortel Networks Limited, St Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/625,255

(22) Filed: Jul. 25, 2000

Related U.S. Application Data

(63) Continuation of application No. 09/106,797, filed on Jun. 29, 1998.
(60) Provisional application No. 60/063,785, filed on Oct. 31, 1997, provisional application No. 60/063,814, filed on Oct. 31, 1997, provisional application No. 60/063,813, filed on Oct. 31, 1997, and provisional application No. 60/063,947, filed on Oct. 31, 1997.

(51) Int. Cl.[7] .............................................. G06F 13/38
(52) U.S. Cl. ...................................... 709/238; 370/292
(58) Field of Search ................................. 370/352, 364, 370/404, 408, 292; 709/238, 239, 253

(56) References Cited

U.S. PATENT DOCUMENTS

| | | | |
|---|---|---|---|
| 5,394,402 A | * 2/1995 | Ross | ........................ 370/402 |
| 5,740,171 A | * 4/1998 | Mazzola et al. | ............ 370/392 |
| 5,742,604 A | * 4/1998 | Edsall et al. | ................. 370/401 |
| 5,796,732 A | * 8/1998 | Mazzola et al. | ............ 370/362 |
| 5,818,838 A | 10/1998 | Backes et al. | |
| 5,822,523 A | 10/1998 | Rothschild et al. | |
| 5,864,535 A | 1/1999 | Basilico | |

(List continued on next page.)

Primary Examiner—Mark H. Rinehart
Assistant Examiner—Bunjob Jaroenchonwanit
(74) Attorney, Agent, or Firm—Blakely Sokoloff Taylor & Zafman LLP

(57) ABSTRACT

A method and apparatus for efficiently switching cells through a switch fabric are provided. According to one aspect of the present invention, logic for forwarding and filtering multicast data is distributed among various layers of a network device, such as a switch, router, bridge, or the like. Data is received at a first port of an input/output (I/O) card. A multicast group identifier corresponding to the data is determined. The data and the multicast group identifier are then transferred to a switching card which indexes into a first set of correlation data with the multicast group identifier to identify a set of egress forwarding paths that lead to I/O cards having members of the multicast group. The switching card forwards the data to the I/O cards via the set of egress forwarding paths identified. For their part, the I/O cards identify a set of ports associated with the multicast group by indexing into a second set of correlation data and forwarding the data to each of the ports identified. According to another aspect of the present invention, a network device comprises a backplane, multiple I/O cards, and a switch core. Correlation data, e.g., in the form of tables indexed by multicast group identifiers, is distributed between the I/O cards and the switch core. The I/O cards each include multiple ports, a first set of correlation data, and a forwarding and filtering mechanism. The first set of correlation data maps multicast group identifiers to ports that are members of the corresponding multicast groups. The forwarding and filtering mechanism is configured to forward multicast data based upon the first set of correlation data The switch core includes a second set of correlation data and a forwarding and filtering mechanism. The switch core's forwarding and filtering mechanism is configured to forward multicast data to member I/O cards based upon the second set of correlation data which maps multicast group identifiers to I/O cards that include member ports.

19 Claims, 9 Drawing Sheets

U.S. PATENT DOCUMENTS

| | | |
|---|---|---|
| 5,898,686 A | 4/1999 | Virgile |
| 5,898,687 A | 4/1999 | Harriman et al. |
| 5,909,438 A | 6/1999 | Melden et al. |
| 5,917,819 A | 6/1999 | Yang et al. |
| 5,930,259 A | 7/1999 | Katsube et al. |
| 5,933,425 A | 8/1999 | Iwata |
| 5,951,651 A | 9/1999 | Lakshman et al. |
| 5,959,989 A | 9/1999 | Gleeson et al. |
| 5,991,295 A | 11/1999 | Tout et al. |
| 5,991,297 A | 11/1999 | Palnati et al. |
| 5,991,298 A | 11/1999 | Hunt et al. |
| 5,991,302 A | 11/1999 | Berl et al. |
| 5,999,531 A | 12/1999 | Ferolito et al. |
| 6,078,595 A * | 6/2000 | Jones et al. .............. 370/503 |

\* cited by examiner

FIG. 10

| CELL BIT | SWITCH SRAM BIT | CELL HEADRER -1000- |
|---|---|---|
| 0 | 0 | PARITY SLICE OVER BITS 7:0 |
| 1 | 1 | PAYLOAD LENGTH BIT 0. PAYLOAD DWORDS-1. ONLY VALID AT END OF PACKET. |
| 2 | 2 | PAYLOAD LENGTH BIT 1. |
| 3 | 3 | PAYLOAD LENGTH BIT 2. |
| 4 | 4 | PAYLOAD LENGTH BIT 3. |
| 5 | 5 | DESTINATION ADDRESS BIT 0. IF UNICAST: QUID PORT NUMBER BIT 0. IF MULTICAST: MULTICAST GROUP IDENTIFIER BIT 0. |
| 6 | 6 | COPY CELL TO MIRROR PORT(S) 1 => A COPY OF THE CELL IS SENT TO ALL MIRROR PORTS |
| 7 | 7 | CELL PRIORITY 1 => HIGH PRIORITY. |
| 8 | 64 | PARITY SLICE OVER BITS 15:8 |
| 9 | 65 | SOURCE PORT NUMBER BIT 0. (QUID PORT NUMBER BIT 0) |
| 10 | 66 | SOURCE PORT NUMBER BIT 1. (QUID PORT NUMBER BIT 1) |
| 11 | 67 | <RESERVED> |
| 12 | 68 | PACKET ERROR. 1=> PACKET ERROR DETECTED BY THE RECEIVE MAC |
| 13 | 69 | DESTINATION ADDRESS BIT 1. IF UNICAST: QUID PORT NUMBER BIT 1. IF MULTICAST: MULTICAST GROUP IDENTIFIER BIT 1. |
| 14 | 70 | DESTINATION ADDRESS BIT 3. IF UNICAST: QUID NUMBER BIT 1. IF MULTICAST: MULTICAST GROUP IDENTIFIER BIT 3. |
| 15 | 71 | DESTINATION ADDRESS BIT 4. IF UNICAST: QUID NUMBER BIT 2. IF MULTICAST: MULTICAST GROUP IDENTIFIER BIT 4. |
| 16 | 128 | PARITY SLICE OVER BITS 23:16 |
| 17 | 129 | START OF PACKET. |
| 18 | 130 | SOURCE PORT NUMBER BIT 2. (QUID NUMBER BIT 0) |
| 19 | 131 | SOURCE PORT NUMBER BIT 3. (QUID NUMBER BIT 1) |
| 20 | 132 | SOURCE PORT NUMBER BIT 4. (QUID NUMBER BIT 2) |
| 21 | 133 | DESTINATION ADDRESS BIT 2. IF UNICAST: QUID NUMBER BIT 0. IF MULTICAST: MULTICAST GROUP IDENTIFIER BIT 2. |
| 22 | 134 | DESTINATION ADDRESS BIT 5. IF UNICAST: QUID NUMBER BIT 3. IF MULTICAST: MULTICAST GROUP IDENTIFIER BIT 5. |
| 23 | 135 | DESTINATION ADDRESS BIT 6. IF UNICAST: QUID NUMBER BIT 4. IF MULTICAST: MULTICAST GROUP IDENTIFIER BIT 6. |
| 24 | 192 | PARITY SLICE OVER BITS 31:24 |
| 25 | 193 | <RESERVED> |
| 26 | 194 | SOURCE PORT NUMBER BIT 5. (QUID NUMBER BIT 3) |
| 27 | 195 | SOURCE PORT NUMBER BIT 6. (QUID NUMBER BIT 4) |
| 28 | 196 | OVERRIDE SAME-SEGMENT DISCARD. 1=>CELL MAY EXIT THROUGH PORT OF ENTRY. |
| 29 | 197 | END OF PACKET. |
| 30 | 198 | COPY CELL TO SYSTEM QUID. 1=>A COPY OF THE CELL IS SENT TO SQUID PORT 1 |
| 31 | 199 | MULTICAST DESTINATION. 1=>MULTICAST DESTINATION. 0=>PHYSICAL DESTINATION. |

Rows 0–7 grouped as 1010. Rows 8–15 grouped as 1020. Rows 16–23 grouped as 1030. Rows 24–31 grouped as 1040.

EFFICIENT PATH BASED FORWARDING AND MULTICAST FORWARDING

This application is a continuation of U.S. patent application Ser. No. 09/106,797, filed on Jun. 29, 1998, which claims the benefit of U.S. Provisional Application No. 60/063,785, U.S. Provisional Application No. 60/063,814, U.S. Provisional Application No. 60/063,813, and U.S. Provisional Application No. 60/063,947 all filed Oct. 31, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a method and apparatus for efficiently forwarding data, such as multicast data, from a source port to one or more destination ports of a networking device.

2. Description of the Related Art

Point-to-multipoint transmission is becoming increasingly important as the number of Internet and Local Area Network (LAN) applications that rely on multicast transmission continues to rise. As used herein "multicast" refers to the transmission of information to a group of recipients (e.g., a multicast group) via a single transmission by the source. Without multicast services, applications dependent upon such services would be forced to send information to groups of users with unicast packets. This means that a server, for instance, would have to send an individual copy of each data packet to all the users in an interest group (e.g., a Virtual LAN (VLAN), or other multicast group, such as an Internet Protocol (IP) multicast group). Unicasting to dispersed groups of users is inefficient for both the data source and the network, thus, network-based multicast services allow servers and other data sources to send out a single packet that is automatically copied and distributed by network devices, such as backbone routers or switches, to every endstation in the target group of users. Network devices that are configured to process multicast traffic typically maintain an internal mapping of multicast groups to member ports. In this manner, the network device can avoid unnecessary flooding of the data by forwarding multicast traffic only on those interfaces known to reach a member of the specified multicast group.

A prior approach for internally mapping multicast groups to interfaces having members is illustrated with reference to FIG. 1. A network device 100 includes a plurality of ports 105–108, switching logic 115, and a shared memory 110. The switching logic 115 maintains one or more output queues 111–113 in the shared memory 110 for each of the plurality of ports 105–108. The switching logic 115 determines with which output queues to associate received multicast data with reference to a multicast table 120. The multicast table 120 maps multicast group identifiers to corresponding per port bit vectors that identify members of the multicast groups. A processor (not shown) within the network device 100 may execute one or more well known multicast protocols, such as a group membership protocol (e.g., Internet Group Management Protocol (IGMP)) and a multicast routing protocol (e.g., Multicast Open Shortest Path First (MOSPF), Distance Vector Multicast Routing Protocol (DVMRP), Protocol Independent Multicasting (PIM)), to facilitate initialization and maintenance of the multicast table 120.

Because the switching logic 115 operates at a port level, a disadvantage of this prior approach is that the switching logic 115 must keep track of a substantial number of output queues in the shared memory 110. Additionally, the switching logic 115 interfaces with each of the ports 105–108. As a result, the switching logic 115 is complex and inefficient. Therefore, a more efficient mechanism for forwarding data through a networking device is needed.

BRIEF SUMMARY OF THE INVENTION

A method and apparatus for efficiently switching data through a switch fabric are described. According to one aspect of the present invention, logic for forwarding and filtering multicast data is distributed among various layers of a network device. Data is received at a first port of an input/output (I/O) card. A multicast group identifier corresponding to the data is determined. The data and the multicast group identifier are then transferred to a switching card which indexes into a fast set of correlation data with the multicast group identifier to identify a set of egress forwarding paths that lead to I/O cards having members of a multicast group corresponding to the multicast group identifier. The switching card forwards the data to the I/O cards via the set of egress forwarding paths identified. For their part, the I/O cards identify a set of ports associated with the multicast group by indexing into a second set of correlation data and forwarding the data to each of the ports identified. Advantageously, rather than tracking information for each port, the switching logic requires only general knowledge regarding which I/O cards have ports that are members of a multicast group, thereby offloading the switching logic and reducing the complexity of the switching logic.

According to another aspect of the present invention, a network device comprises a backplane, multiple I/O cards, and a switch core. Correlation data is distributed between the I/O cards and the switch core. The I/O cards each include multiple ports, a first set of correlation data, and a forwarding and filtering mechanism. The first set of correlation data maps multicast group identifiers to ports that are members of the corresponding multicast groups. The forwarding and filtering mechanism is configured to forward multicast data based upon the first set of correlation data. The switch core includes a second set of correlation data and a forwarding and filtering mechanism. The second set of correlation data maps multicast group identifiers to I/O cards that include one or more member ports. The switch core's forwarding and filtering mechanism is configured to forward multicast data to member I/O cards based upon the second set of correlation data.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 10 illustrates a cell header format according to one embodiment of the present invention.

DETAILED DESCRIPTION OF THE INVENTION

Figure 1:
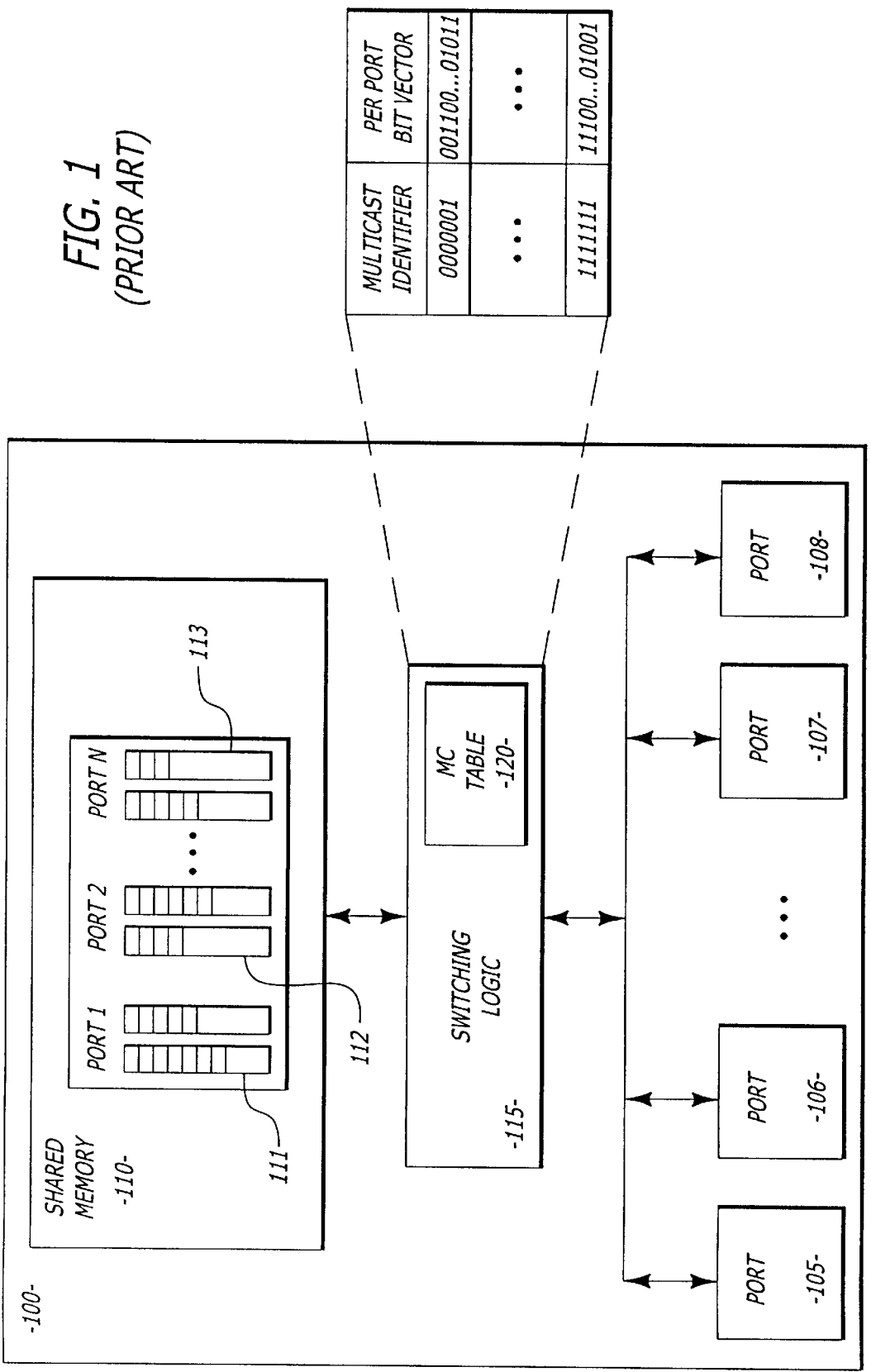
FIG. 1 is a simplified block diagram which illustrates a prior approach for forwarding data in a networking device.

A method and apparatus for efficiently switching data through a switch fabric are described. Using the teachings of the present invention, switching overhead may be reduced by providing one or more layers of abstraction between the switch core and the ports of a network device. According to one aspect of the present invention, data forwarding and filtering is performed at an I/O card and/or I/O interface level by switching logic while port-specific processing is performed by the source and destination port interface devices. In the context of multicast traffic, rather than the switching logic tracking each port that is participating in a multicast group, information regarding group membership may be distributed at various levels of the network device architecture. For example, the switch core may maintain information that maps a multicast group identifier to zero or more egress forwarding paths. The egress forwarding paths associated with a particular multicast group identifier are those upon which multicast data destined for the corresponding multicast group is to be forwarded. Port-level forwarding and filtering of multicast data may be performed with reference to mappings of multicast groups to physical ports maintained local to port interface devices which are disposed between the switch core and the physical ports. In this manner, the switching logic needs only general knowledge regarding which I/O cards and/or I/O interfaces have ports that are members of a multicast group, thereby offloading the switching logic and reducing the complexity of the switching logic. By way of example, the number of output queues and interfaces may be reduced by a factor of X, where X represents the number of ports per I/O card. Additionally, the hierarchical distribution of multicast control information reduces the amount of information that needs to be accessed and processed at a given point as the multicast data is forwarded though the networking device.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software. Importantly, while embodiments of the present invention will be described with reference to an Ethernet switch, the method and apparatus described herein are equally applicable to other types of network devices, such as routers, bridges, and the like.

Exemplay Packet Forwarding Device Architecture

Figure 2:
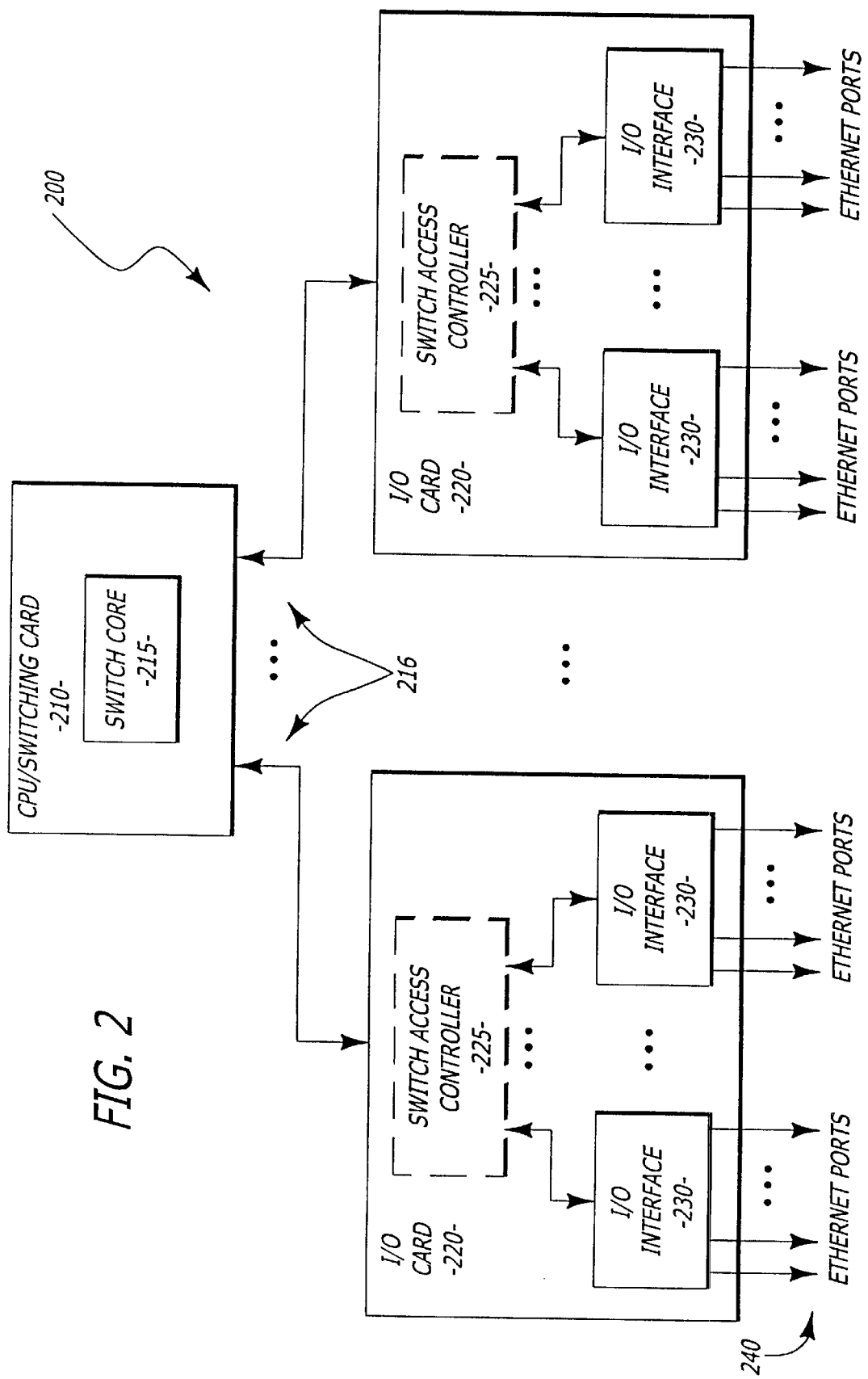
FIG. 2 is a high level block diagram of a packet forwarding device according to one embodiment of the present invention.

A high level view of an exemplary architecture in which embodiments of the present invention may be implemented is depicted in FIG. 2. In this example, a switching device 200 comprises a central processing unit (CPU)/switching card 210 coupled to a plurality of input/output (I/O) cards 220. The I/O cards 220 are coupled to the switching card's switch core 215 though one or more buses 216 (individually referred to as "switch taps", "tap buses," or simply "taps"). The taps provide a path for received data from the ingress I/O card to the switch core 215 (the "ingress forwarding path") and from the switch core 215 to the egress I/O card (the "egress forwarding path").

Data, typically in the form of variable-length packets, enters the switching device 200 via one of a plurality of Ethernet ports 240. As will be described further below, the inbound packet data is segmented into fixed-sized cells containing data and forwarding control information. Based upon the forwarding control information, the switch core 215 steers the cells to the appropriate egress I/O card(s) 220 where the cells are reassembled into packets and transmitted onto the appropriate physical ports. Each of the plurality of I/O cards 220 includes a plurality of I/O interfaces 230 for interfacing with the physical ports 240 and performing other port-level processing, such as packet reassembly. For implementations with a large number of I/O interfaces 230, the I/O cards 220 may also include an optional switch access controller 225 to control access to the switch core 215 and to perform a second level of forwarding and filtering of data exiting the particular I/O card. However, when only a few I/O interfaces 230 (e.g., typically less than eight) reside on the I/O cards 220, then no switch access controller 225 is necessary and the taps 216 may be coupled directly to one or more I/O interface. Further details regarding the switching device architecture will be provided after describing the interaction of various exemplary function units operable within the switch core 215, the switch access controller 225, and the I/O interfaces 220.

Figure 3A:
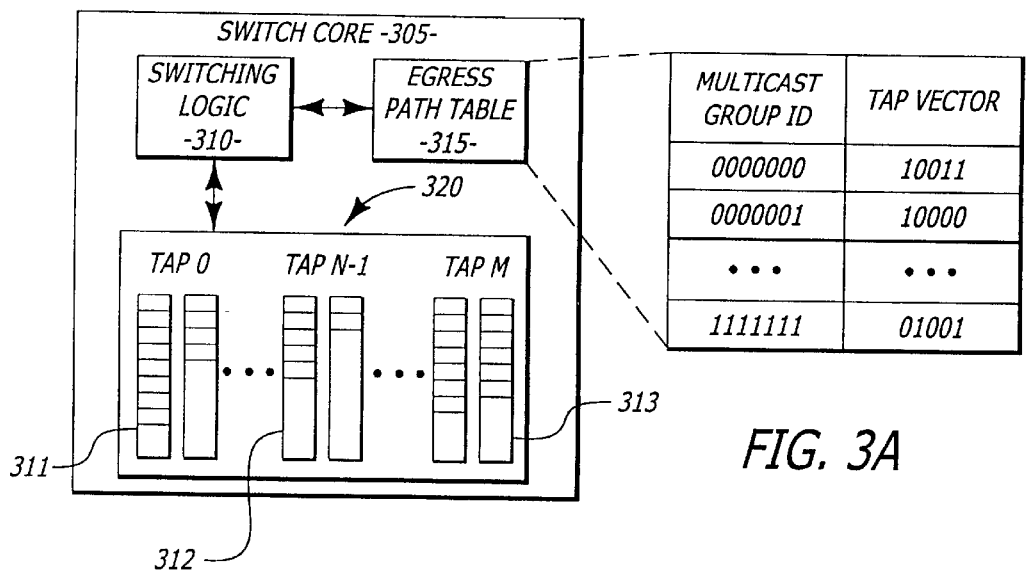
FIGS. 3A–3C illustrate the interaction of various functional units of a packet forwarding device according to one embodiment of the present invention.
Figure 3B:
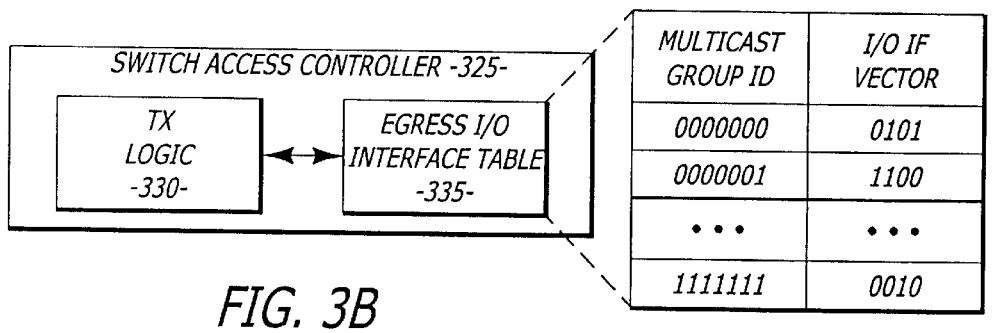
Figure 3C:
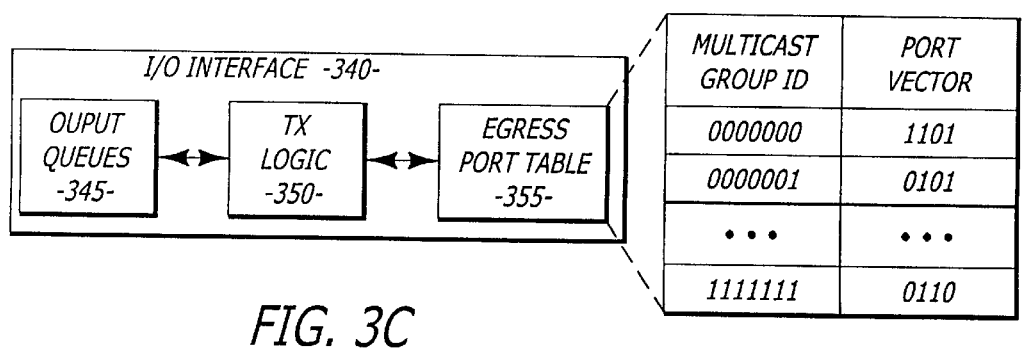

FIGS. 3A–3C illustrate the interaction of functional units that may be employed to perform forwarding and filtering of multicast traffic according to one embodiment of the present invention. According to the embodiment depicted in FIG. 3A, a switch core 305 includes switching logic 310, an egress path table 315, and output queues 320. In this example, the switch core 305 maintains a pair of high and low-priority output queues 311, 312 for each of the N taps and also maintains high and low-priority output queues 313 for a virtual multicast tap (identified as tap M). As part of the switching logic's ingress processing, the switching logic 310 receives data from the ingress forwarding path and associates it with one or more egress forwarding paths by linking the data to one of the output queues 320. Unicast data is linked to one of the output queues associated with taps 0 through N-1 and multicast data is linked to tap M. In an alternative embodiment, the switching logic 310 may be configured to associate multicast data with multiple output queues during ingress processing thereby eliminating the need for separate multicast queues.

The egress path table 315 is typically used by the switching logic 310 during egress processing to determine upon which tap(s) a particular multicast cell is to be forwarded. The egress path table 315 establishes a correlation between multicast group information, e.g., a multicast group identifier, and taps 216 that are associated with the multicast group information. More specifically, the egress path table 315 includes data that identifies those of the taps 216, if any, that lead to one or more ports 240 that are members of a particular multicast group. In this example, a 7-bit multicast group identifier is used as an index to the egress path table 315. The 5-bit tap vector corresponding to a particular index represents a bit per tap bit vector (i.e., a vector with a status bit corresponding to each switch tap of the network device) that identifies those of the switch taps 216 whose associated I/O cards include one or more ports that are members of the multicast group. In this example, a '1' indicates the presence of one or more members on the associated egress forwarding path and a '0' indicates the absence of members on the egress forwarding path. Therefore, taps 0, 3, and 4 each include one or more members of multicast group 0, tap 0 includes at least one member of multicast group 1, and taps 1 and 4 include members of multicast group 127. It is appreciated that more or less bits may be used for either or both of the multicast group identifier or the tap vector to account for more or less taps, additional status values, and/or more or less multicast groups. As one feature of the present embodiment, a significant amount of queue processing is saved by queuing data on a tap basis rather than by output port. For example, assuming each I/O card supports X ports, then the number of output queues may be reduced by a factor of X. Additionally, by pushing port specific processing down into the I/O cards 220, the complexity of the switching logic 310 is reduced.

Referring now to FIG. 3B, an exemplary switch access controller 325 is described. According to the embodiment depicted, the switch access controller 325 comprises transmit logic 330 and an egress I/O interface table 335. The egress I/O interface table 335 establishes a correlation between multicast groups and I/O interfaces 220 that are associated with the multicast groups. More specifically, the egress I/O interface table 335 includes data that identifies those of the I/O interfaces 230, if any, that lead to one or more ports 240 that are members of a particular multicast group. As part of its egress processing, the transmit logic 330 determines to which I/O interfaces 230 multicast cells are to be forwarded with reference to the egress I/O interface table 335. As above, in this example, a 7-bit multicast group identifier is used as an index into the egress I/O interface table 335. The I/O interface bit vector corresponding to a particular index identifies those of the I/O interfaces 230 coupled to the switch access controller 325 that include one or more ports that are members of the multicast group. Therefore, in this example, I/O interfaces 1 and 3 include one or more members of multicast group 0, I/O interfaces 0 and 1 include members of multicast group 1, and only I/O interface 2 has a member of multicast group 127. Again, it is appreciated that more or less bits may be used for either or both of the multicast group identifier or the I/O interface vector to account for more or less I/O interfaces per switch access controller 325, additional status values, and/or more or less multicast groups. As one feature of the present embodiment, multiple switch access controllers 325 may share a tap while still assuring containment of multicast traffic due to the filtering performed by each switch access controller 325.

FIG. 3C illustrates an I/O interface 340 according to one embodiment of the present invention. In the embodiment depicted, the I/O interface 340 includes transmit logic 350, an egress port table 355, and output queues 345. The transmit logic 350 queues multicast packets for transmission on only those output queues associated with ports that are members of the multicast group to which the packet is addressed. As above, multiple I/O interfaces 340 may share a tap or interface with a switch access controller 325 because filtering performed in each I/O interface 340 will assure containment of multicast traffic.

Figure 4:
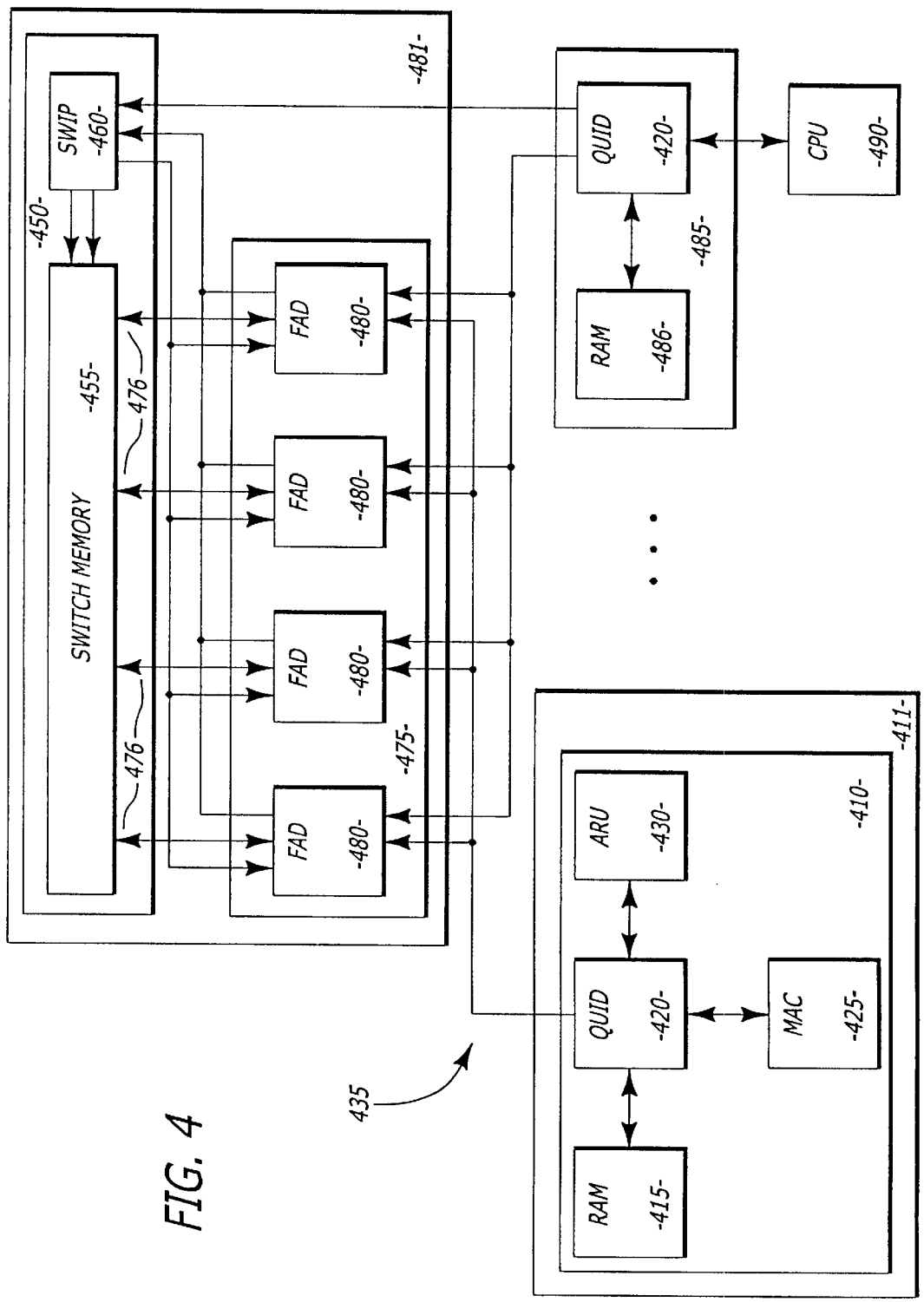
FIG. 4 is a more detailed block diagram of a packet forwarding device according to one embodiment of the present invention.

A more detailed view of an architecture of a network device, e.g., switching device 400, in which various embodiments of the present invention may be implemented will now be described with reference to FIG. 4. According to the embodiment depicted, switching device 400 is an output buffered, shared memory switch. Switching device 400 includes a plurality of input/output (I/O) interfaces 410 coupled in communication with a switch core. The switch core comprises a switch fabric 450 and a fabric interface 475. Also coupled to the switch core via interface 485 is a central processing unit (CPU) 490 which may facilitate management of forwarding and filtering databases of the I/O interfaces 410 by executing one or more well known multicast protocols, such as a group membership protocol (e.g., Internet Group Management Protocol (IGMP)) and a multicast routing protocol (e.g., Multicast Open Shortest Path First (MOSPF), Distance Vector Multicast Routing Protocol (DVMRP), Protocol Independent Multicasting (PIM)), and updating the egress tables 315, 335, and 355 to reflect the current membership status.

Inbound packet data is provided by the I/O interface 410 to the fabric interface 475 which steers the data through the switch fabric 450. When the packet data exits the switch fabric 450 it passes again through fabric interface 475 and ultimately to one or more I/O interfaces 410 from which the packet data is to be transmitted. The I/O interfaces 410 are coupled to the switch core though one or more bus interfaces 435 (also referred to as "switch taps"). The switch taps 435 move packet data between the switch core and the I/O interfaces 410. While for convenience, only one I/O interface 410 has been depicted, it should be appreciated the tap bus 435 may comprise a plurality of point-to-point buses coupling each I/O interface 410 to the fabric interface 475. The fabric interface 475 may be thought of conceptually as a large multiplexer (MUX)/demultiplexer (demux) with storage. The fabric interface 475 muxes the tap buses 435 into a bus 476 coupled to the switch fabric 450. Forwarding control bits from the packet data are also presented by the fabric interface 475 to the switch fabric 450 to facilitate cell queuing.

The switch fabric 450 includes a switch memory 455 and a switch processor (SWIP) 460. The SWIP 460 logically organizes the packet data read into the switch memory 455 by associating the packet data with one of a plurality of output queues. Additionally, the SWIP 460 controls the flow of data between the fabric interface 475 and the switch memory 455 and the flow of data between the fabric interface 475 and the I/O interfaces 410. According to one embodiment, port-level details are concealed from the SWIP 460 to reduce the complexity and increase the efficiency of the switching logic. For example, data forwarding and filtering may be performed at the I/O card or I/O interface level by the switching logic while port-specific processing is handled internal to the I/O card 411. Additionally, this layer of abstraction allows fewer output queues to be maintained by the SWIP 460 since cells may be grouped by egress forwarding path rather than by output port. Packet processing performed local to the I/O card 411 and cell processing performed by the SWIP 460, particularly processing of multicast data, will be described in detail below.

Each I/O interface 410 may include one or more Port Interface Devices (PIDs), such as a Quad-port Interface Device (QUID) 420. The I/O interfaces 410 may each additionally include one or more Media -Access Controllers (MACs) 425, Address Resolution Units (ARUs) 430, and memories 415. In one embodiment, one or more of the MACs 425 comprise 84C301 Seeq Quad 10/100 MAC devices which may support up to four 10/100 Megabit per second (Mbps) ports (not shown). While, for the sake of explanation, (CSMA/CD) is assumed to be the medium access method employed by the MACs 425, it is appreciated that the MACs 425 may operate according to other communication protocols, such as the well-known Fiber Distributed Data Interface (FDDI) or Asynchronous Transfer Mode (ATM) communication protocols.

As will be discussed further below, in the present embodiment, packets are forwarded among QUIDs 420 through the switch core in the form of fixed-length cells. As packets are read from the MAC 425, forwarding control information necessary for steering the data through the switch fabric 450 may be inserted into the fixed-length cells by the ingress PID (e.g., the QUID 420 upon which a particular packet is received). The ingress PID interfaces with its associated ARU 430 to acquire a destination address and other forwarding control information that may be associated with a packet.

Referring now to the fabric interface 475, according to the embodiment depicted, it comprises a plurality of fabric access devices (FADs) 480. Cells may be exchanged between the QUIDs 420 and the FADs 480 by handshaking with the SWIP 460. Each FAD 480 muxes the tap buses 435 coupled to the PIDs 420 into the bus 476 coupled to the switch memory 455. According to one embodirnent, the FADs 480 each accept a slice of the tap bus width. For example, for a 32-bit tap bus 435 each FAD 480 may accept mutually exclusive 8-bit slices during tap bus cycles. The FADs 480 conveying cell data and forwarding control information to the switch memory 455 and SWIP 460, respectively. In one embodiment, the FAD-SWIP and FAD-switch memory interfaces may be implemented as described in copending patent application Ser. No. 09/036,374 entitled "Early Availability of Forwarding Control Information" and assigned to the assignee of the present invention.

Returning to the switch fabric 450, in one embodiment the switch memory 455 is implemented with a 64K×456 pipelined synchronous static random access memory (SRAM). However, it is appreciated that various other types of random access memory (RAM) may be employed to provide for the temporary storage of cells received from the fabric interface 475. A plurality of output queues are maintained within the switch fabric 450 by the SWIP 460. In one embodiment, the switch memory 455 serves as a pool of buffers which are logically associated with one or more predetermined groups by the SWIP 460. For example, data structures and head and tail queue pointers into the switch memory 455 may be maintained and manipulated by the SWIP 460 as cells are stored and retrieved from the switch memory 455. Various mechanisms are available for organizing the cells into groups for output. In one embodiment, the number of output queues is twice the number of switch taps 435 plus two. In this example, high and low priority queues are maintained for each switch tap 435 and a high and low priority queue are maintained for multicast cells.

It is appreciated that each of the functional units described above may be implemented with hard wired circuitry, Application Specific Integrated Circuits (ASICs), by causing a processor to execute instructions, or a combination thereof. Importantly, the present invention is not limited to a particular implementation of these functional units.

Data Forwarding and Filtering

Having described exemplary packet forwarding devices at various levels of detail and the interaction of functional units that may be employed by the present invention, data forwarding and filtering will now be described with reference to FIGS. 5 through 9. The steps described below represent exemplary processing that may be performed during the course of forwarding data from an ingress port to one or more output ports. The steps may be performed under the control of a programmed processor, such as the SWIP 460 or CPU 490. Alternatively, the logic may be implemented and distributed among hardware or software within the I/O cards 220, I/O interfaces 230, switch access controllers 225 and/or the switch core 215, for example.

According to the present embodiment, packets are forwarded among the I/O interfaces 230 through the switch core 215 in the form of fixed-length cells. Port interface devices (e.g., QUIDs 420) fragment inbound packets (i.e., those received from the MAC 425) prior to providing them to the switch core 215 and perform reassembly upon outbound cells (i.e., those received from the switch core 215). As packets are read from the MAC 425, forwarding control information necessary for steering the data through the switch core 215 to the I/O interface 230 at which the data will exit may be prepended and/or appended to packets and/or the associated fixed-length cells by the ingress port interface device (e.g., the QUID 420 upon which a particular packet is received). In the case of data that is destined for multiple output ports (e.g., multicast data), the forwarding control information may include a multicast group identifier which is used by the switch core 215, the optional switch access controller 225, and the I/O interfaces 230 to forward the data to the appropriate output ports. According to one embodiment of the present invention, VLANs, and other multicast groups, such as Internet Protocol (IP) multicast groups are associated with member ports through multiple layers of correlation data, such as the multicast tables described previously. Additionally, the diverse types of tags and identifiers employed by the various mechanisms for defining interest groups may be translated to a local multicast group. For example, the ARU 430 may map an IP multicast group ID or a VLAN tag, such as an IEEE 802.1Q tag, to a multicast group identifier by way of a look-up table. As described above, various multicast protocols, such as Multicast Open Shortest Path First (MOSPF), Protocol Independent Multicast (PIM), Distance Vector Multicast Routing Protocol (DVMRP), and Internet Group Management Protocol (IGMP), may be employed to facilitate the internal tracking and maintenance of the multicast group identifiers and other correlation data. The forwarding control information may also include information indicating the need for certain other packet/cell processing. For instance, a multicast flag may be provided in the cell header to cause the egress PID to replace the source MAC address for IP Multicast routed packets. An exemplary cell header format will be described further below.

Figure 5:
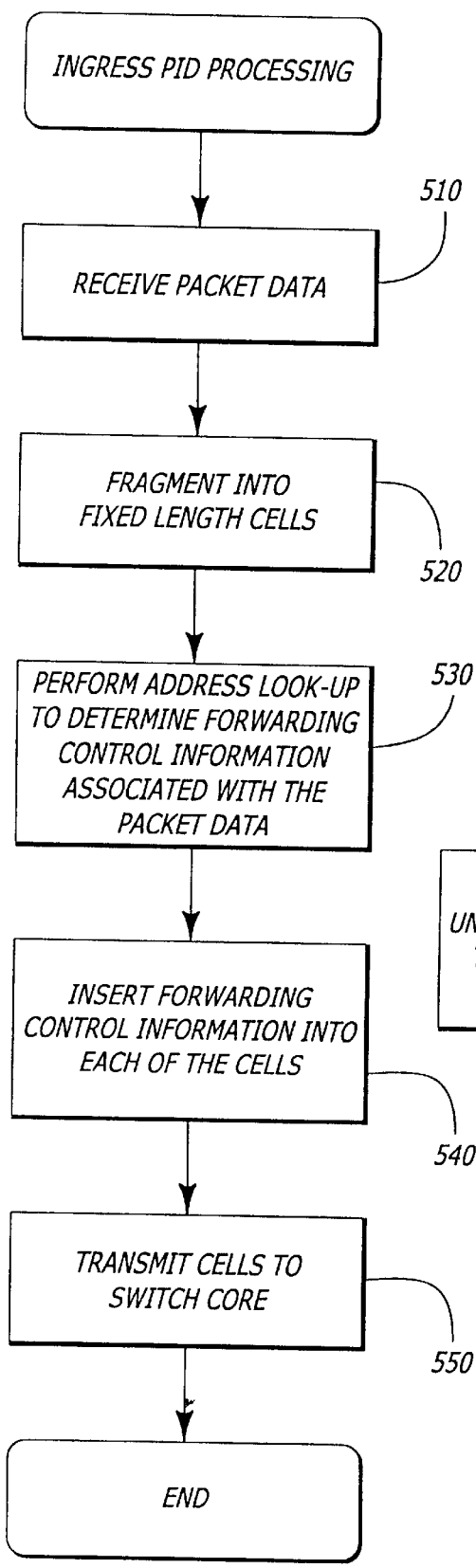
FIG. 5 is a flow diagram illustrating ingress port interface device processing according to one embodiment of the present invention.

FIG. 5 is a flow diagram illustrating ingress port interface device processing according to one embodiment of the present invention. In the example illustrated, packet data is received at step 510. The packet is fragmented into fixed-length cells (step 520) that include a header portion for carrying control information, such as forwarding control information, and a payload portion for carrying data. At step 530, forwarding control information associated with the packet is determined by the ARU 430, for example. Determining the forwarding control information for a particular packet may include performing Layer 2, e.g., Media Access Control (MAC) layer, or Layer 3, e.g., Network layer, address look-up to determine a destination address. Importantly, the destination address may represent either a multicast or unicast destination as will be described further below. In any event, the forwarding control information retrieved from the ARU 430 is then inserted into packet and/or cell headers or trailers (step 540) before the data is provided to the switch core 215 (step 550).

Figure 6:
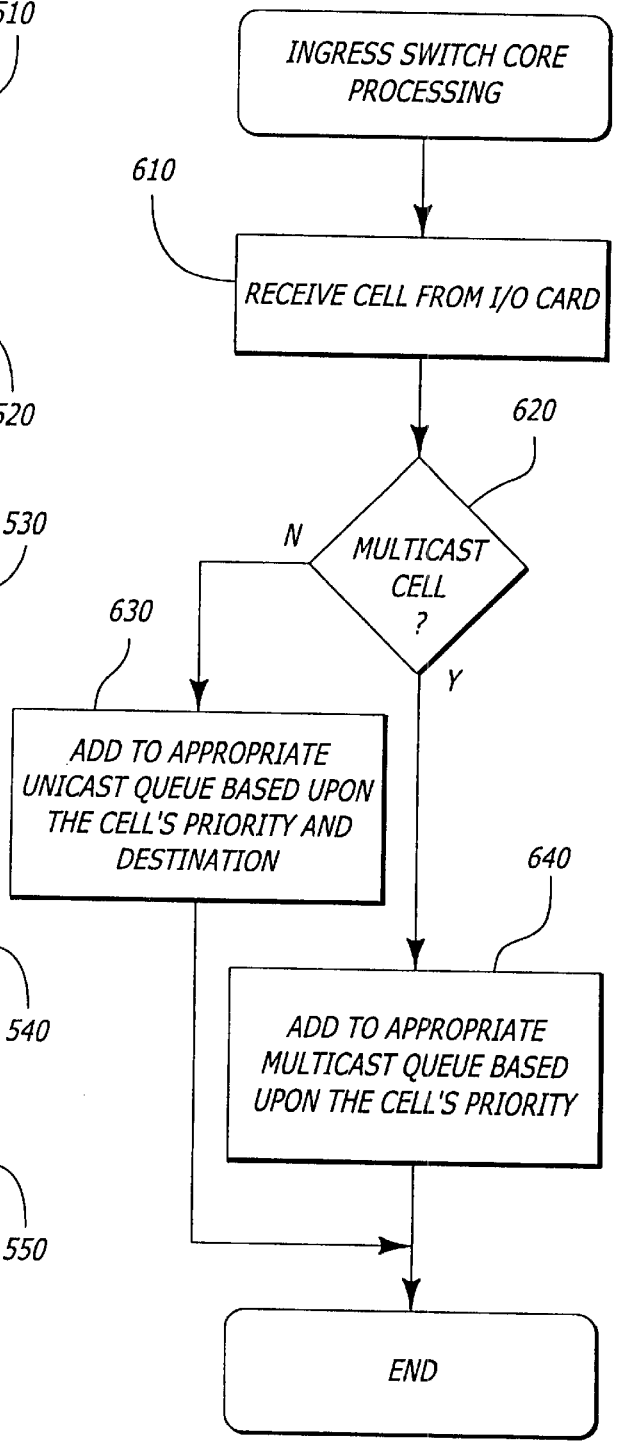
FIG. 6 is a flow diagram illustrating ingress switch core processing according to one embodiment of the present invention.

FIG. 6 is a flow diagram illustrating ingress switch core processing according to one embodiment of the present invention. At step 610, a cell is received from an I/O card 220. A determination is made whether the cell is a multicast cell or a unicast cell (step 620). According to one embodiment, unicast and multicast cells may be distinguished based upon information contained within the cell header. However, it is appreciated various other mechanisms may be employed. At any rate, if the cell is a multicast cell, then at step 640 the cell is added to the appropriate multicast queue based upon the cell's priority (e.g., high or low). Otherwise, if the cell is a unicast cell, then at step 630 the cell is added to the appropriate unicast queue based upon the cell's priority and destination.

Figure 7:
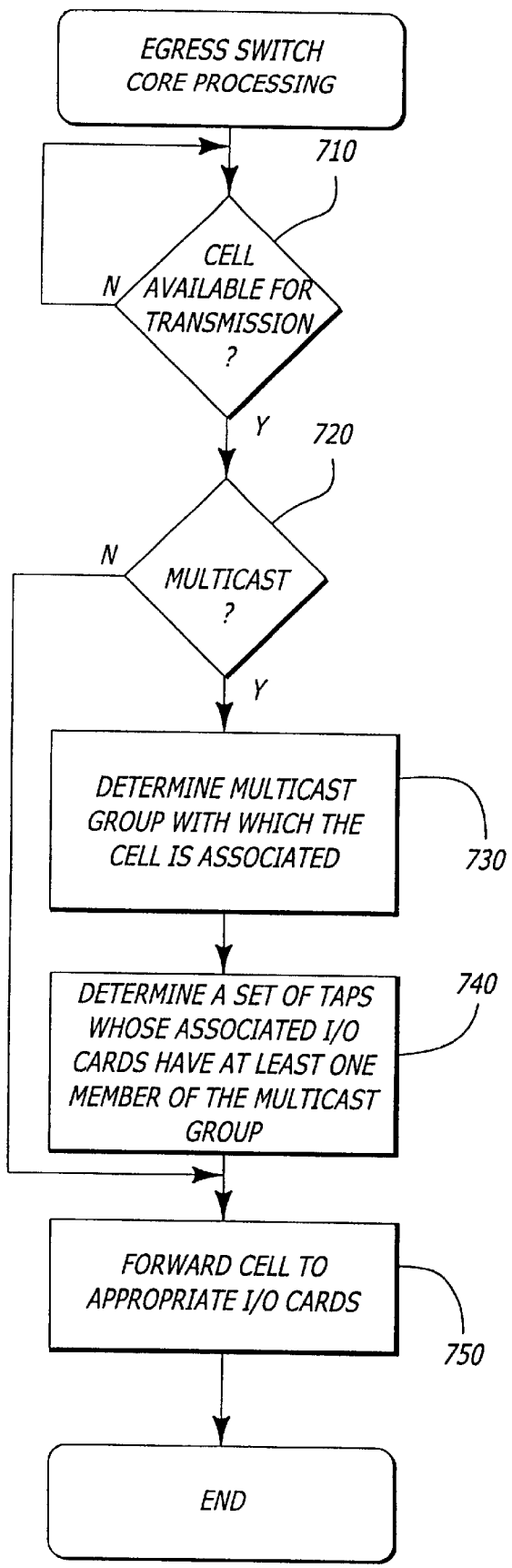
FIG. 7 is a flow diagram illustrating egress switch core processing according to one embodiment of the present invention.

FIG. 7 is a flow diagram illustrating egress switch core processing according to one embodiment of the present invention. In this example, the switching logic 310 polls the output queues 320 to determine if a cell is available for transmission (step 710). At step 720 a determination is made whether the cell is a multicast cell or a unicast cell. If the cell is a multicast cell, at step 730 the multicast group with which the cell is associated is determined. In one embodiment, a multicast group identifier is included within each cell header. At step 740, a set of taps whose associated I/O cards have at least one member of the multicast group is determined with reference to a set of correlation data that relates I/O cards and multicast group identifiers. For example, the multicast group identifier may be used as an index into a set of correlation data, such as the egress path table 315 to retrieve a tap vector. The tap vector identifies taps on which data destined for a particular multicast groups is to be forwarded. At step 750, the cell is forwarded to the appropriate I/O cards.

Figure 8:
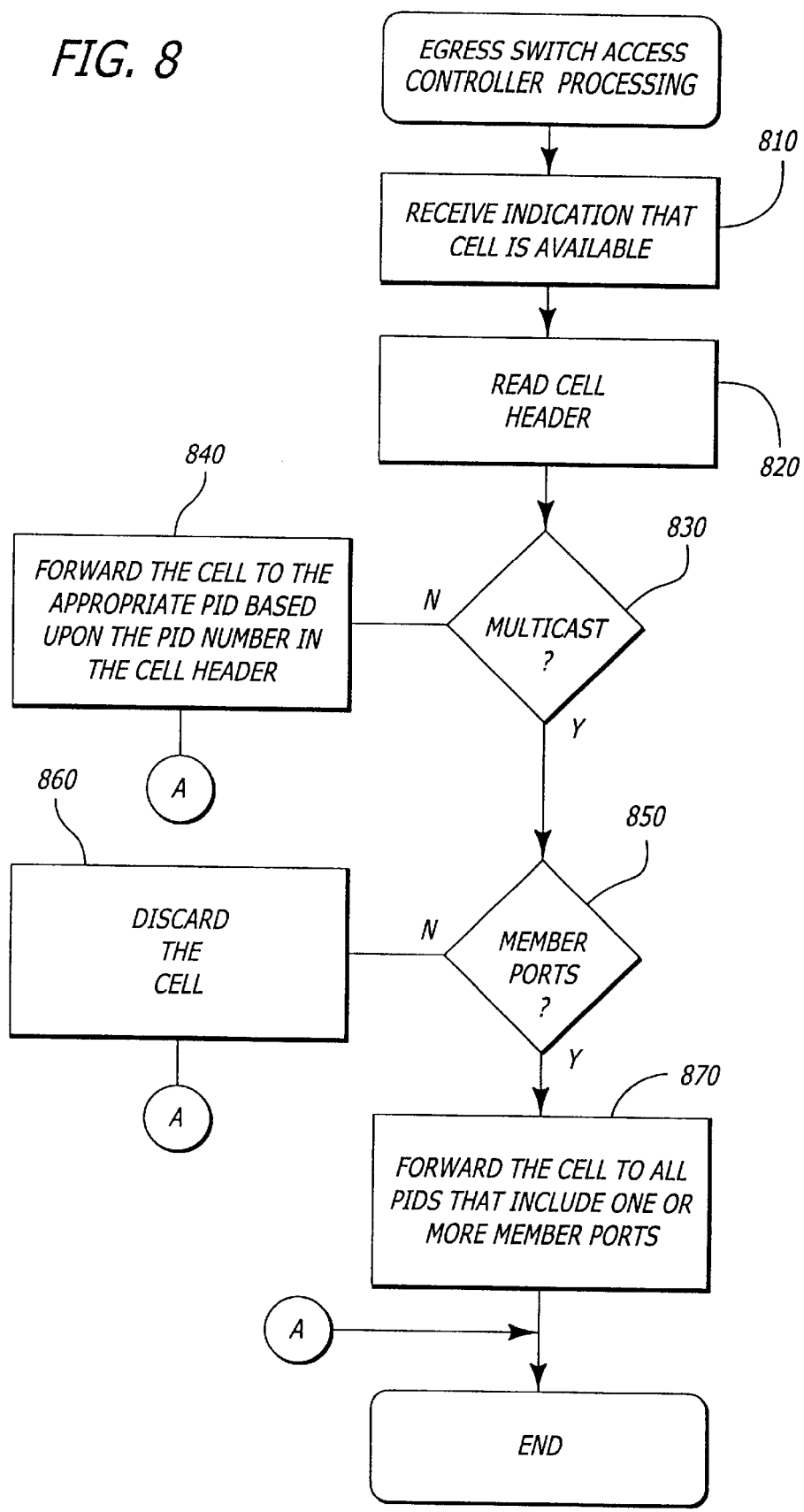
FIG. 8 is a flow diagram illustrating egress switch access controller processing according to one embodiment of the present invention.

FIG. 8 is a flow diagram illustrating egress switch access controller processing according to one embodiment of the present invention. At step 810, an indication is received that a cell from the switch core is available for egress switch access controller processing. The cell header is read at step 820. Based on the cell header, a determination is made as to whether the cell is a multicast cell or a unicast cell (step 830). If the cell is a unicast cell then the cell is forwarded to the appropriate PID based upon the PID number in the cell header (step 840). Otherwise, if the cell is a multicast cell, then at step 850, it is determined whether or not the switch access controller leads to any ports that are members of the multicast group to which the cell is destined. This determination may be accomplished by indexing into a set of correlation data, such as the egress I/O interface table 335, that establishes a correlation between multicast groups and I/O interfaces that have member ports. If no member ports can be reached from the switch access controller, then at step 860 the multicast cell is discarded. Otherwise, the switch access controller forwards the cell to all PIDs that include one or more member ports (step 870). After step 860 or 870 egress switch access controller processing continues at step 810.

Figure 9:
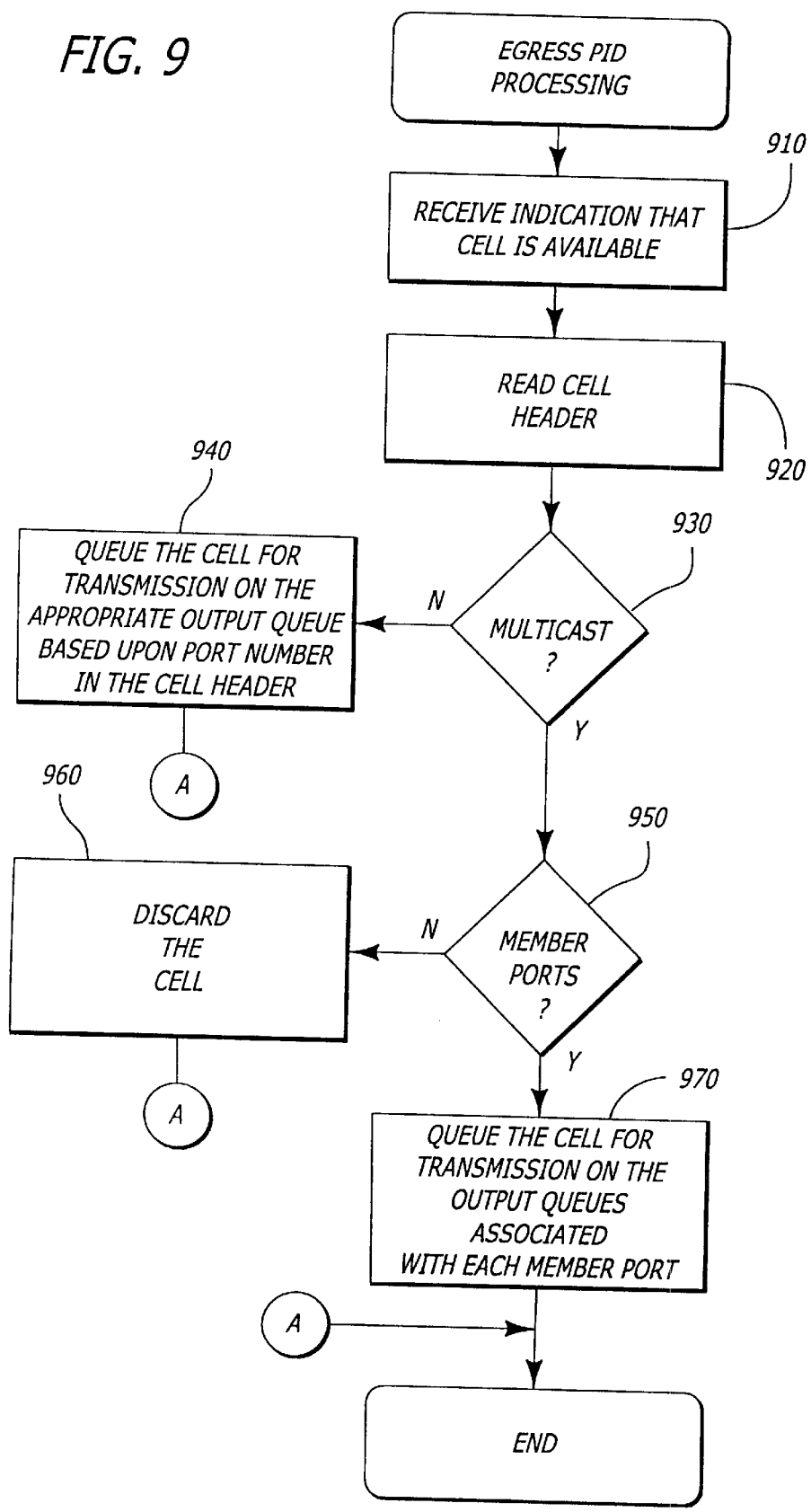
FIG. 9 is a flow diagram illustrating egress port interface device processing according to one embodiment of the present invention.

FIG. 9 is a flow diagram illustrating egress port interface device processing according to one embodiment of the present invention. At step 910, an indication is received that a cell from the switch access controller is available for egress PID processing. The cell header is read at step 920. Based on the cell header, a determination is made as to whether the cell is a multicast cell or a unicast cell (step 930). If the cell is a unicast cell then the cell is queued for transmission of the appropriate output queue based upon the port number in the cell header (step 940). Otherwise, if the cell is a multicast cell, then at step 950, it is determined whether or not the PD has any ports that are members of the multicast group to which the cell is destined. This determination may be accomplished by indexing into a set of correlation data, such as the egress port table 355, that establishes a correlation between multicast groups and member ports. If there are no member ports, then at step 960 the multicast cell is discarded. Otherwise, the PID queues the cell for transmission on the output queues associated with each member port. After step 960 or 970 egress PID access processing continues at step 910.

Cell Encapsulation

As described earlier, in one embodiment, the port interface devices fragment inbound packets into fixed-length cells. Each cell may include 60 bytes of payload and a cell header. FIG. 10 illustrates a cell header format that may used for encapsulation of packet data within cells according to one embodiment of the present invention. In this example, a four-byte cell header 1000 is appended to each cell by the ingress port interface device. Assuming four FADs 480 accept equal-sized, mutually exclusive slices of the cell header 1000, each FAD 480 receives one byte. A first byte 1010 of the cell header 1000 may be buffered in a first FAD 480. A second byte 1020 is accepted and buffered in a second FAD 480. A third FAD 480 buffers a third byte 1030 and the last byte 1040 is buffered in a fourth FAD 480.

Cells are associated with output queues by the SWIP 460 based upon one or more portions of their forwarding control information. In this example, the forwarding control information includes: (1) a destination address (i.e., cell header bits 5, 13, 14, 15, 41, 42, and 43); (2) a cell priority, i.e., cell header bit 7; and (3) a multicast flag, i.e., cell header bit 31. The multicast flag indicates whether the cell is to be appended to one of the unicast switching queues or one of the multicast switching queues. As a feature of this embodiment, the multicast flag allows the destination address bits to be interpreted as either a physical destination or a multicast destination. When the cell is part of a multicast packet, the destination address may represent a multicast group identifier. When the cell is part of a unicast packet, the destination address may be represented by a combination of a PID number and the PID port number, or either taken alone. Specifically, in the examples illustrated herein, the destination address may represent a 7-bit physical destination (e.g., a 5-bit PID number and a 4-bit port number) or a 7-bit multicast group identifier. It is appreciated that more or less bits of forwarding control information may be employed. For example, it may be desirable to allocate more or less bits to one or more of the PID number, the port number, or the multicast group identifier depending upon the particular implementation. Also, in alternative embodiments, the header information, including the forwarding control information may be distributed between a cell header and a cell trailer. Additional, it is appreciated different sized headers or trailers may be employed or all the information may be placed in either a cell header or a cell trailer without using the other. Further, other arrangements of the bits and distributions across the FADs 480 may be employed.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A networking device comprising:
    a backplane;
    a plurality of input/output (I/O) cards coupled to the backplane, each of the plurality of I/O cards comprising:
        a plurality of ports, and
        a first logic circuit to forward multicast data to selected ports of said plurality of ports that are associated with a multicast data identifier, wherein said first logic circuit comprises a first set of correlation data that is associated with said multicast group identifier that identifies a set of egress forwarding paths that lead to said selected ports; and
    a switch core coupled to the backplane, the switch core comprising a second logic circuit to forward said multicast data to selected I/O cards of said plurality of I/O cards associated with said multicast data identifier, wherein said second logic circuit comprises a second set of correlation data that is associated with said multicast group identifier that identifies a set of egress forwarding paths that lead to said selected I/O cards.

2. The networking device of claim 1, wherein said backplane comprises a plurality of buses.

3. The networking device of claim 1, wherein said first logic circuit comprises a first set of correlation data that is associated with said multicast group identifier that identifies a set of egress forwarding paths that lead to said selected ports.

4. The networking device of claim 1, wherein said first logic circuit comprises a table to map multicast group identifiers with egress forwarding paths to corresponding ports.

5. The networking device of claim 1, wherein said second logic circuit comprises a first set of correlation data that is associated with said multicast group identifier that identifies a set of egress forwarding paths that lead to said selected I/O cards.

6. The networking device of claim 1, wherein said second logic circuit comprises a table to map multicast group identifiers with egress forwarding paths from the switching core to corresponding I/O cards.

7. The network device of claim 1, wherein said first logic circuit comprises a first table to map multicast group identifiers with egress forwarding paths to corresponding ports, and wherein said second logic circuit comprises a second table to map multicast group identifiers with egress forwarding paths from the switching core to corresponding I/O cards.

8. A method of routing a multicast cell received at an input port to a plurality of second hierarchical level switching elements, comprising:
    determining a multicast group identifier for said multicast cell;
    using said multicast group identifier to identify a plurality of first hierarchical level switching elements by indexing a first set of correlation data with the multicast group identifier to identify a first set of egress forwarding paths that lead to said identified first hierarchical level switching elements;
    forwarding said multicast cell and said multicast group identifier to said identified first hierarchical level switching elements;
    utilizing said multicast group identifier to identify said plurality of second hierarchical level switching elements by indexing a second set of correlation data with the multicast group identifier to identify a second set of egress forwarding paths that lead to said identified second hierarchical level switching elements; and
    forwarding said multicast cell to said identified second hierarchical level switching elements.

9. The method of claim 8, wherein at least one of said first hierarchical level switching elements comprises an input/output card.

10. The method of claim 8, wherein at least one of said second hierarchical level switching elements comprises an input/output interface having a plurality of ports.

11. The method of claim 8, wherein the first set of correlation data is stored locally on a switching core, wherein the first set of correlation data comprises a table correlating multicast group identifiers with egress forwarding paths from the switching core to the first hierarchical level switching elements, and wherein indexing the first set of correlation data with the multicast group identifier to identify said set of egress forwarding paths that lead to said identified first hierarchical level switching elements further includes accessing a vector corresponding to the multicast group identifier, the vector containing information indicative of the multicast group membership status of each egress forwarding path.

12. The method of claim 8, wherein said utilizing said multicast group identifier comprises indexing a first set of correlation data with the multicast group identifier to identify a set of egress forwarding paths that lead to said identified second hierarchical level switching elements.

13. The method of claim 12, wherein the first set of correlation data is stored locally on each of said first hierarchical level switching elements, wherein the first set of correlation data comprises a table correlating multicast group identifiers with egress forwarding paths from the first hierarchical level switching elements to corresponding second hierarchical level switching elements, and wherein indexing the first set of correlation data with the multicast group identifier to identify said set of egress forwarding paths that lead to said identified second hierarchical level switching elements further includes accessing a vector corresponding to the multicast group identifier, the vector containing information indicative of the multicast group membership status of each egress forwarding paths.

14. A method of routing a multicast cell received at an input port to a plurality of second hierarchical level switching elements, comprising the steps of:
    determining a multicast group identifier for said multicast cell;
    using said multicast group identifier to identify a plurality of first hierarchical level switching elements by indexing a first set of correlation data with the multicast group identifier to identify a first set of egress forwarding paths that lead to said identified first hierarchical level switching elements;

forwarding said multicast cell to said identified first hierarchical level switching elements;

utilizing said multicast group identifier to identify said plurality of second hierarchical level switching elements by indexing a second set of correlation data with the multicast group identifier to identify a second set of egress forwarding paths that lead to said identified second hierarchical level switching elements; and forwarding said multicast cell to said identified second level switching elements.

15. The method of claim 14, wherein at least one of said first hierarchical level switching elements comprises an input/output card.

16. The method of claim 14, wherein at least one of said second hierarchical level switching elements comprises an input/output interface having a plurality of ports.

17. The method of claim 14, wherein the first set of correlation data is stored locally on a switching core, wherein the first set of correlation data comprises a table correlating multicast group identifiers with egress forwarding paths from the switching core to the first hierarchical level switching elements, and wherein indexing the first set of correlation data with the multicast group identifier to identify said set of egress forwarding paths that lead to said identified first hierarchical level switching elements further includes accessing a vector corresponding to the multicast group identifier, the vector containing information indicative of the multicast group membership status of each egress forwarding paths.

18. The method of claim 14, wherein the step of utilizing said multicast group identifier comprises indexing a first set of correlation data with the multicast group identifier to identify a set of egress forwarding paths that lead to said identified second hierarchical level switching elements.

19. The method of claim 18, wherein the first set of correlation data is stored locally on each of said first hierarchical level switching elements, wherein the first set of correlation data comprises a table correlating multicast group identifiers with egress forwarding paths from the first hierarchical level switching elements to corresponding second hierarchical level switching elements, and wherein the step of indexing the first set of correlation data with the multicast group identifier to identify said set of egress forwarding paths that lead to said identified second hierarchical level switching elements further includes a step of accessing a vector corresponding to the multicast group identifier, the vector containing information indicative of the multicast group membership status of each egress forwarding paths.

* * * * *